(12) United States Patent
Bankston et al.

(10) Patent No.: US 12,014,374 B2
(45) Date of Patent: *Jun. 18, 2024

(54) IDENTITY-BASED TRANSACTION PROCESSING

(71) Applicant: Visa International Service Association, San Francisco, CA (US)

(72) Inventors: Michael Bankston, Oakland, CA (US); Erik Friend, Mountain View, CA (US); Jerry Wald, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,753

(22) Filed: Mar. 28, 2022

(65) Prior Publication Data

US 2022/0222673 A1 Jul. 14, 2022

Related U.S. Application Data

(63) Continuation of application No. 16/277,587, filed on Feb. 15, 2019, now Pat. No. 11,321,716.

(51) Int. Cl.
*G06Q 20/00* (2012.01)
*G06Q 20/40* (2012.01)
(Continued)

(52) U.S. Cl.
CPC ..... *G06Q 20/4016* (2013.01); *G06Q 20/4014* (2013.01); *H04L 9/006* (2013.01); *H04L 9/3271* (2013.01); *H04L 2209/56* (2013.01)

(58) Field of Classification Search
CPC .................................................. G06Q 20/4016
See application file for complete search history.

(56) References Cited

U.S. PATENT DOCUMENTS 9,178,879 B2 * 11/2015 Baliga ..................... G06F 21/34
9,355,155 B1 5/2016 Cassel et al.
(Continued)

FOREIGN PATENT DOCUMENTS

KR 20160073418 A 6/2016

OTHER PUBLICATIONS

Core Identities for Future Transaction Systems IEEE (2019) (Year: 2019).*

(Continued)

*Primary Examiner* — Bruce I Ebersman
(74) *Attorney, Agent, or Firm* — Kilpatrick Townsend & Stockton LLP

(57) ABSTRACT

Methods and systems disclosed herein related to analyzing the risk of an identity-based transaction and offering the identity-based transaction to a risk exchange. An identity-based transaction may be a transaction that is initiated with a digital identity, and an assertions model manager may provide assertions about the digital identity for completing the identity-based transaction. The assertions model manager may use the assertions and information about the identity-based transaction to analyze transaction risk. A risk score for the identity-based transaction can be calculated, and then the identity-based transaction may be offered on a risk exchange.

16 Claims, 9 Drawing Sheets

(51) Int. Cl.
*H04L 9/00* (2022.01)
*H04L 9/32* (2006.01)

(56) References Cited

U.S. PATENT DOCUMENTS

| | | | |
|---|---|---|---|
| 10,154,030 B2 | 12/2018 | Madhu et al. | |
| 10,826,900 B1* | 11/2020 | Poder | H04L 63/105 |
| 11,259,184 B1* | 2/2022 | Pickering | G07F 7/1033 |
| 11,321,716 B2* | 5/2022 | Bankston | H04L 9/3239 |
| 2005/0097046 A1 | 5/2005 | Singfield | |
| 2011/0271110 A1* | 11/2011 | Ohba | H04W 12/0433 |
| | | | 713/168 |
| 2011/0313835 A1 | 12/2011 | Falkenborg et al. | |
| 2012/0203698 A1 | 8/2012 | Duncan et al. | |
| 2012/0290482 A1 | 11/2012 | Atef et al. | |
| 2013/0124285 A1* | 5/2013 | Pravetz | G06Q 20/40 |
| | | | 705/14.23 |
| 2014/0330722 A1* | 11/2014 | Laxminarayanan | |
| | | | G06Q 20/3227 |
| | | | 705/44 |
| 2015/0112870 A1 | 4/2015 | Nagasundaram et al. | |
| 2015/0269578 A1 | 9/2015 | Subramanian et al. | |
| 2015/0310195 A1* | 10/2015 | Bailor | G06F 21/45 |
| | | | 726/6 |
| 2016/0057149 A1* | 2/2016 | Baliga | G06F 21/34 |
| | | | 726/4 |
| 2016/0212132 A1* | 7/2016 | Banerjee | H04W 12/082 |
| 2016/0294879 A1 | 10/2016 | Kirsch | |
| 2016/0321661 A1* | 11/2016 | Hammond | G06Q 20/20 |
| 2016/0378970 A1* | 12/2016 | Campbell | G06F 21/575 |
| | | | 726/17 |
| 2017/0004487 A1 | 1/2017 | Hagen et al. | |
| 2017/0041296 A1 | 2/2017 | Ford et al. | |
| 2017/0250972 A1* | 8/2017 | Ronda | H04L 9/0891 |
| 2017/0364917 A1 | 12/2017 | Karantzis | |
| 2018/0144345 A1* | 5/2018 | Wagner | G06Q 20/4016 |
| 2018/0204281 A1 | 7/2018 | Painter et al. | |
| 2018/0254907 A1 | 9/2018 | Gasparini | |
| 2018/0288063 A1 | 10/2018 | Koottayi et al. | |
| 2018/0300729 A1 | 10/2018 | Siddens et al. | |
| 2019/0020478 A1* | 1/2019 | Girish | H04L 9/3271 |
| 2019/0098056 A1 | 3/2019 | Pitre et al. | |
| 2019/0149524 A1 | 5/2019 | Bankston et al. | |
| 2019/0319987 A1 | 10/2019 | Levy et al. | |
| 2020/0052897 A1* | 2/2020 | Girish | H04L 9/3271 |
| 2020/0162515 A1 | 5/2020 | Dubinsky et al. | |
| 2020/0167871 A1 | 5/2020 | Basu et al. | |
| 2020/0265435 A1* | 8/2020 | Bankston | G06Q 20/4014 |

OTHER PUBLICATIONS

Why the Equifax Breach Should Not Have Mattered arxiv(2017) (Year: 2017).*
3 Core Identities for Future Transaction Systems, Mit 2019.*
A Survey of Payment Approaches for Identity Federations in Focus of the SAML Technology, IEEE 2019.*
McLaughlin et al., "A Model for Identity in Digital Eco Systems", 2009 3rd IEEE International Conference on Digital Ecosystems and Technologies, 2011.
L. Jean Camp, "Identity Authentication and Identifiers in Digital Government", Proceedings. International Symposium on Technology and Society, 2003. Crime Prevention, Security and Design., 2009.
U.S. Appl. No. 16/277,587, "Final Office Action", dated Sep. 3, 2021, 10 pages.
U.S. Appl. No. 16/277,587, "Non-Final Office Action", dated Apr. 30, 2021, 11 pages.
U.S. Appl. No. 16/277,587, "Notice of Allowability", dated Feb. 18, 2022, 5 pages.
U.S. Appl. No. 16/277,587, "Notice of Allowance", dated Feb. 9, 2022, 17 pages.
PCT/US2019/018268, "International Search Report and Written Opinion", dated Nov. 15, 2019, 10 pages.

* cited by examiner

IDENTITY-BASED TRANSACTION PROCESSING

CROSS-REFERENCES TO RELATED APPLICATIONS

This application is a Continuation Application of U.S. patent application Ser. No. 16/277,587, filed on Feb. 15, 2019, which is herein incorporated by reference in its entirety for all purposes.

BACKGROUND

A digital identity (DI) may include a secure set of information about an entity (e.g., a person, organization, or thing). The DI may, in turn, be made available to another entity in a secure manner. In order to receive information about a DI, an entity may request an assertion, or statement of fact about the DI. When using a DI for an identity-based transaction, a user may need to authenticate themselves. Requiring authentication for each transaction can create friction in transactions and inconvenience the user and/or the resource provider.

In a transaction, there is typically a certain amount of risk that the transaction will not be completed, and a value associated with that risk. For example an issuer may assume the risk for a transaction and agree to complete a payment if a user defaults on the payment.

Improved ways of analyzing and managing transaction risk during an identity-based transaction are needed. Embodiments of the invention address these and other problems individually and collectively.

BRIEF SUMMARY

Embodiments of the disclosure include methods as well as systems for providing assertions regarding entities that overcome some or all of the above-described deficiencies.

One embodiment is directed to a method comprising: receiving, at an assertions computer, an authorization request message for an identity-based transaction, the authorization request message comprising a resource provider identifier and an identifier of a digital identity of a user; determining an assertions model based on the resource provider identifier and the digital identity, the assertions model comprising a set of assertions; determining a set of accounts associated with the user based on the set of assertions; calculating a risk score associated with the identity-based transaction; and performing processing of the identity-based transaction based on the risk score.

Another embodiment is directed to an assertions computer comprising a processor and a computer readable medium comprising code, executable by the processor, for implementing a method comprising: receiving, at the assertions computer, an authorization request message for an identity-based transaction, the authorization request message comprising a resource provider identifier and an identifier of a digital identity of a user; determining an assertions model based on the resource provider identifier and the digital identity, the assertions model comprising a set of assertions; determining a set of accounts associated with the user based on the set of assertions; calculating a risk score associated with the identity-based transaction; and performing processing of the identity-based transaction based on the risk score.

These and other embodiments of the invention are described in further detail below.

DETAILED DESCRIPTION

Figure 1:
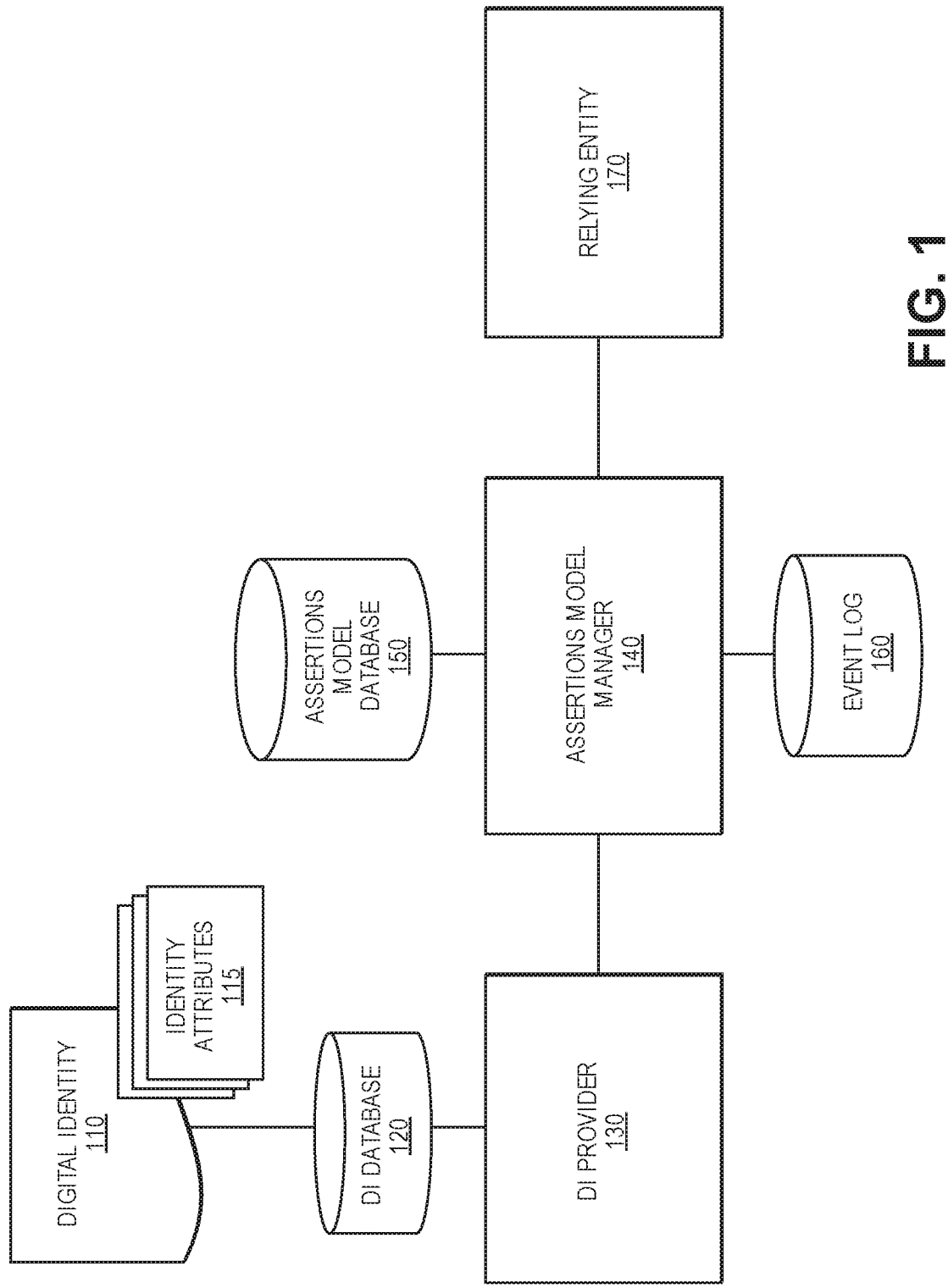
FIG. 1 shows a block diagram of a system for providing assertions according to embodiments.

Embodiments of the invention provide a system and method for determining the risk associated with an identity-based transaction. Previous methods of risk assessment have used information about an account of a user to determine a risk associated with a transaction. However, more information about the user and their accounts can be available in transactions that are initiated with a digital identity. This can allow for a more accurate assessment of the transaction's risk. The risk may be the monetary value of the probability that the transaction is not successfully completed. The trustworthiness of an entity providing a transaction may also be a factor used when assessing risk.

The risk assessment may then be used to offer the value of risk for the transaction in a risk marketplace. In a risk marketplace, parties can agree to take on the risk of a transaction. Such parties may include resource providers, account providers, or other third party risk takers. By taking on the risk, a party may agree to settle a transaction if the transaction does not complete. The risk assessment may then be used to determine a price to offer in exchange for the transaction's risk across a large pool of transactions.

Prior to discussing embodiments of the invention, some terms can be described in further detail.

The term "identifier" may include any indicator that may be used to identify information. In some embodiments, the identifier may be a special value generated randomly or according to a predetermined algorithm, code, or shared secret. For example, an individual may be identified using a driver's license number or a cryptographic key. In some embodiments, the identifier may be one or more graphics, a token, a bar code, a QR code, or any other information that may be used to uniquely identify an entity.

An "issuer" may be a financial institution, such as a bank, that creates and maintains financial accounts for account holders. An issuer or issuing bank may issue and maintain financial accounts for consumers. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication). In some embodiments, an issuer may be a publisher and may operate or be in communication with a publisher processor.

An "acquirer" may be a financial institution associated with a merchant. Acquirers typically provide merchants with a bank account, and in some cases, transaction accepting infrastructure. Generally, after a transaction has been authorized and as part of the settlement process, funds are transferred from the issuer to merchant's account at the acquirer. The acquirer may also communicate payment transaction status with the merchant. The acquirer may operate an acquirer computer, which may generically be a transport computer.

A "payment processing network" may be data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. The payment processing network may use any suitable wired or wireless network, including the internet.

An "authorization request message" may be a message that is sent to request authorization for a transaction. An authorization request message may be sent, for example to a payment processing network, an issuer of a payment card, a payment processor, a cryptocurrency network, and/or an automated clearing house. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, for example, a service code, a CW (card verification value), a dCW (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be a message reply to an authorization request message. The authorization response message may be generated, for example, by an issuing financial institution, a payment processing network, a cryptocurrency network, a payment processor, and/or an automated clearing house. The authorization response message may include, for example, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "access device" may be any suitable device for providing access to an external computer system. An access device may be in any suitable form. Some examples of access devices include point of sale (POS) devices, cellular phones, PDAs, personal computers (PCs), tablet PCs, smart TVs, hand-held specialized readers, set-top boxes, electronic cash registers (ECRs), automated fuel dispensers (AFDs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "authorizing entity" may be an entity that authorizes a request. Typically an authorizing entity may use an authorizing computer to do so. An authorizing entity may be an issuer, a governmental agency, a document repository, an access administrator, etc.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key. In some embodiments, a public key may be an index in a distributed ledger.

A "private key" may include a cryptographic key that forms a private key of a public/private key pair. A private key may be used to decrypt data encrypted with a public key.

A "cryptogram" may include an encrypted representation of some information. A cryptogram can be used by a recipient to determine if the generator of the cryptogram is in possession of a proper key, for example, by encrypting the underlying information with a valid key, and comparing the result to the received cryptogram.

A "distributed ledger" may include a database that is shared among multiple nodes across a network. Entities corresponding to each node may store identical copies of the ledger at a given time. The entities may have permission to make changes or additions to the ledger. When the ledger is changed, the participating entities may receive the updated ledger. Examples of distributed ledgers include a blockchain, wherein transactions are verified before being encrypted and recorded to the ledger in a block of transactions.

A "digital identity" (DI) may include a secure set of information about an entity (e.g., a person, organization, or thing). A DI may comprise a plurality of identity attributes, as well as an identifier of the digital identity. The identity attributes may be pieces of information about the entity. For example, a DI for a user Joe Smith may include identity attributes such as the user's date of birth, social security number, address, and driver's license number, as well as an identifier such as Joe_Smith_1234 which is used to identify Joe Smith's digital identity. The DI may be made available to another entity in a secure manner. DIs may rely on agreements among stakeholders and security measures such as cryptography.

An "assertion" may include a secure fact about an entity. For example, an assertion may specify something about an entity, such as whether the entity has the attributes required to rent a car. For example, an assertion about the entity in this context may be "this user is over 25 years old." An assertion may be based on one or more identity attributes, or pieces of information about the entity. An assertion may be secured cryptographically. An assertion may be digitally signed by the entity of interest and/or the trusted party providing the secure facts.

An "assertions model" may be a set of assertions. The assertions model may be predetermined and may depend on the entity that is requesting the assertions, or the type of entity that is requesting the assertions. For example, an assertions model for car rental agencies may comprise assertions that an entity has a valid driver's license, that the entity is of legal age to rent a vehicle, and that the entity has a valid account with an issuer. Assertions models may also be specific to the relying entity requesting the assertions. For example, an assertions model for an entity that controls a secure building may comprise assertions that an entity has the attributes required to have authorization to enter the secure building. Assertions models may be used to prevent a relying entity from learning more information than is desired about another entity, specifically to prevent unauthorized profiling of the entity.

FIG. 1 shows a block diagram of an assertions model manager according to embodiments of the invention. FIG. 1 includes a digital identity 110, the digital identity comprising a plurality of identity attributes 115, a DI database 120, a DI provider 130, an assertions model manager 140, an assertions model database 150, an event log 160, and a relying entity 170. Any of the devices in FIG. 1 may be in communication via a suitable communications network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The digital identity 110 may be associated with a user that is conducting a transaction with the relying entity 170. In some embodiments, the user may be assigned an identifier. The identifier of the user may include data associated with a digital signature and/or cryptographic key of the user. Alternatively, or additionally, the identifier of the user may include an ID number, a QR code, and/or the like.

The digital identity 110 may comprise a plurality of identity attributes 115. The identity attributes 115 may be pieces of information about the user. For example, an identity attribute may be the user's date of birth, social security number, address, driver's license number, etc. Identity attributes 115 may be used to generate assertions about the user. For example, the identity attribute of date of birth may be used to generate an assertion that the user is at least 18 year of age. Identity attributes 115 may be derived from a variety of references. For example, a birth certificate or a social media profile may be used as sources for identity attributes 115. The source of an assertion may be the source of the identity attributes 115 that the assertion is based on.

A DI provider 130 may provide digital identities and assertions associated with those digital identities. The DI provider 130 may have access to a digital identity 110. The DI provider may provide assertions based on the identity attributes 115 of the digital identity 110. The DI provider 130 may be have access to the digital identity 110 via a DI database 120. The DI provider 130 may be, for example, an issuer, an acquirer, a transaction service provider, or a government agency. The DI provider 130 may be configured to create and store DIs. The DI provider may be able to store the DI, for example in a DI database 120. In some embodiments, the DI provider 130 may generate assertions. In some embodiments the DI provider 130 may be referred to as a publisher. The DI provider 130 may also have, or be in communication with, a writing processor that can write assertions.

A DI provider 130 may retrieve data from another source. Such a primary source of information may be referred to as a reference. References are generally trusted sources of information. A reference may be a verified document (e.g., a birth certificate, driver's license, password, credit card, etc.). Alternatively, or additionally, a reference may be an entity, such as a government agency, bank, individual, etc., that can provide trusted information. In some cases, a user may have an account with a reference. Then, the reference may also be referred to as an account provider. In some embodiments, the DI provider 130 may establish a DI based on information gathered from one or more references.

In some embodiments, the DI provider 130 may be assigned an identifier. The identifier of the DI provider may include data associated with a digital signature and/or cryptographic key of the DI provider 121.

An assertions model manager 140 can maintain and store assertions models for making assertions about the digital identity 110. An assertions model can be standardized such that information from various DI providers 130 about digital identity 110 can be organized into a set of assertions that is uniform regardless of the DI provider 130 or the reference. The assertions model may also be standardized to provide predetermined types of assertions regarding a digital identity 110 to a relying entity 170, or type of relying entity. In some embodiments, assertions models can be stored in the assertions model database 150. In some embodiments, the assertions model manager 140 may be referred to as a market platform.

In some embodiments, the assertions model can include at least one type of assertion. For example, the assertions model can include a set of assertion types sufficient to be considered "well formed" for the relevant domain. Additionally or alternatively, the assertions model can include data associated with additional identifiers, including but not limited to a name/identifier and current version of the assertions model and the date on which the assertions model was last updated.

The assertions model database 150 may store assertions models used by the assertions model manager 140. The assertions model database may make the assertions models available based on the relying entity. For example, the assertions models database 150 may group together all assertions models and/or types of assertions available to a relying entity or type of relying entity. The assertions model manager 140 may also store assertions models based on the pairwise relationship between digital identity 110 and relying entity 170. The assertions model manager 140 may include or be in communication with the assertions model database 150.

The assertions model database 150 may be a storage unit and/or device (e.g., a file system, database, collection of tables, or other storage mechanism) for storing data. The assertions model database 150 may include multiple different storage units and/or devices. The assertions model database 150 may store assertions models and types of assertions.

The assertions model manager 140 may also include or be in communication with an event log 160. The event log 160 may be a file, a collection of files, or a database for storing event data. Each event may correspond to a request for information. For example, an event may correspond to a relying entity request for user data in association with a transaction. For a particular event, the system may store event data such as the parties involved, a type of the event, a timestamp, etc. Each event may be encrypted using a set of cryptographic keys. An event may, for example, be encrypted using a cryptographic key of the user, a cryptographic key of the DI provider 130, and/or a cryptographic key of the relying entity 170. The event may further be encrypted with cryptographic keys assigned to other entities, such as one or more third party facilitators or technology providers (e.g., financial transaction processors).

The event log 160 may be used to access event metadata for tasks such as dispute resolution, fraud detection, and/or analysis of user behaviors. By restricting access to the cryptographic keys needed to access one or more events, the event structure helps to keep data associated with a user private. For example, a private key held by a user may be required to access event data, ensuring that event data is only available with explicit permission from the user. Access paths to the event data may be defined via a common API structure. The access paths may be established such that limited entities may access the events with limited amounts of data. The event log 160 may be stored in a database. Additionally, or alternatively, the event log may be stored in a distributed ledger, including but not limited to a blockchain.

Relying entity 170 may be an entity requesting one or more assertions. For example, the relying entity 170 may be a merchant requesting information (e.g., assertions) about the user associated with the digital identity 110 with respect to a payment transaction. In another example, the relying entity 170 may be a government agency requesting information (e.g., assertions) about the user associated with the digital identity 110 with respect to granting access to a secured area or another non-payment transaction. In some embodiments the relying entity 170 may be referred to as a subscriber. The relying entity 170 may also have, or be in communication with, a subscriber processor that can read assertions. In some embodiments, the relying entity may be a resource provider. A relying entity may or may not be a resource provider. For example, a relying entity may be a person that does not provide a specific resource.

In some embodiments, the relying entity 170 may be assigned an identifier. The identifier of the relying entity may include data associated with a digital signature and/or cryptographic key of the relying entity 170.

Figure 2:
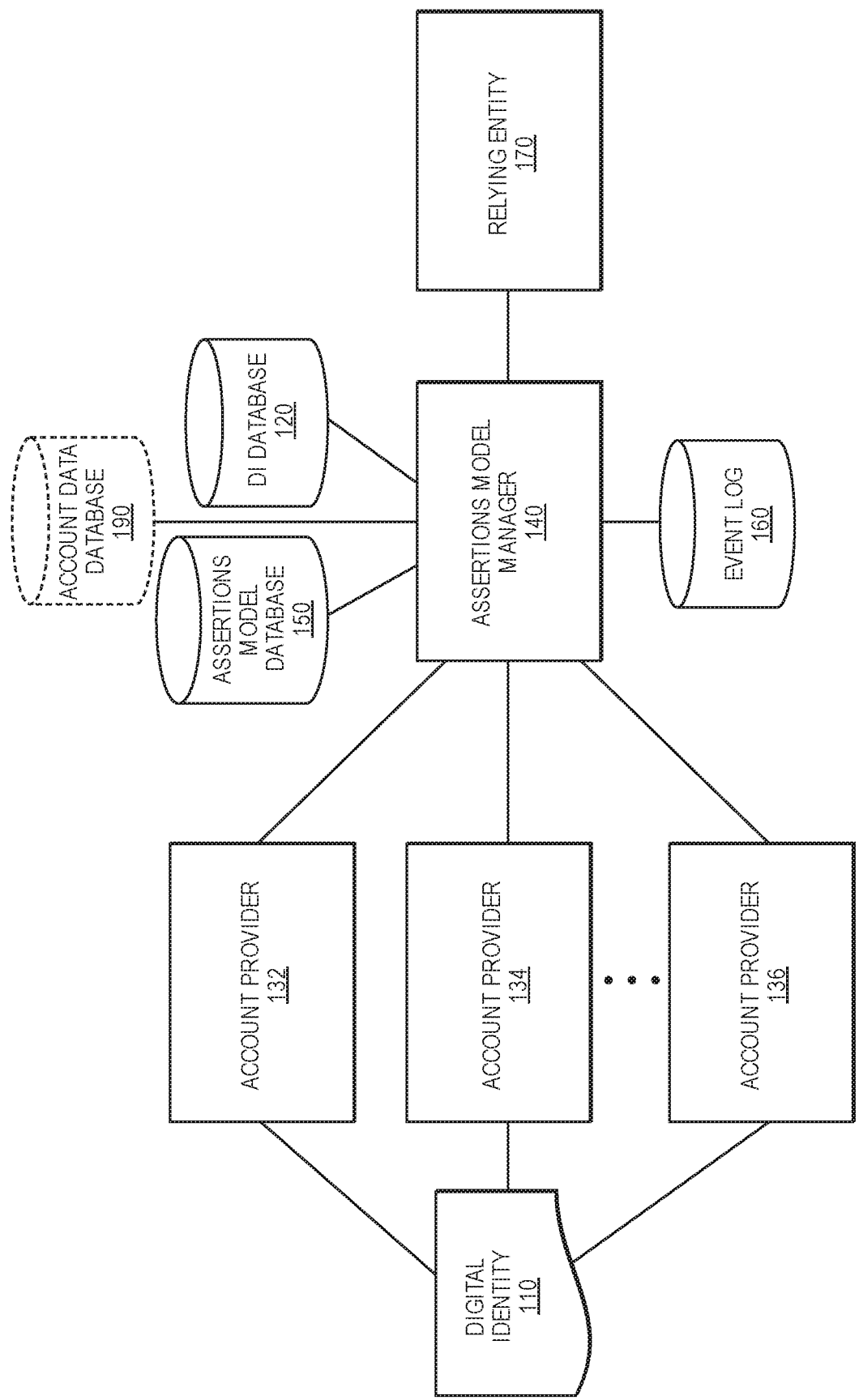
FIG. 2 shows a block diagram of a system for providing assertions regarding a user with multiple accounts according to embodiments.

FIG. 2 shows a block diagram of an assertions model manager with a plurality of account providers associated with a digital identity.

A digital identity 110 can be associated with a plurality of account providers 132, 134, 136. The account providers may be in communication with an assertions model manager 140. The assertions model manager 140 may have an assertions model database 150, an event log 160, and DI database 120. The assertions model manager 140 may also have an account data database 190 to store information about the accounts associated with account providers 132, 134, 136. The assertions model manager 140 may send assertions to a relying entity 170.

The account providers 132, 134, 136 may maintain accounts of the user. The account providers 132, 134, 136 may also be references that provide information about the user to the assertions model manager 140. For example, one or more of the account providers may be an issuer of the user. One or more of the account providers may also be an automated clearinghouse (ACH) network or a cryptocurrency network.

The account data database 190 may have information about the accounts of users that have accounts with the account providers 132, 134, 136. The account data database 190 may also have information about accounts such as whether or not the user has an account with a particular account provider, or if a valid payment token is available. Other information in the account data database 190 may include the length of time that the user has maintained an account with the account provider. The account data database 190 may also have historical information about the accounts of the user. For example, account data database may have a record of past transactions completed by the user, and/or settlement rates of transactions completed by the user.

In some embodiments, the account data database 190 may be part of an assertions database. Some assertions may have information about accounts associated with the digital identity. Therefore, the subset of account assertions in an assertions database may comprise the account data database 190.

Figure 3:
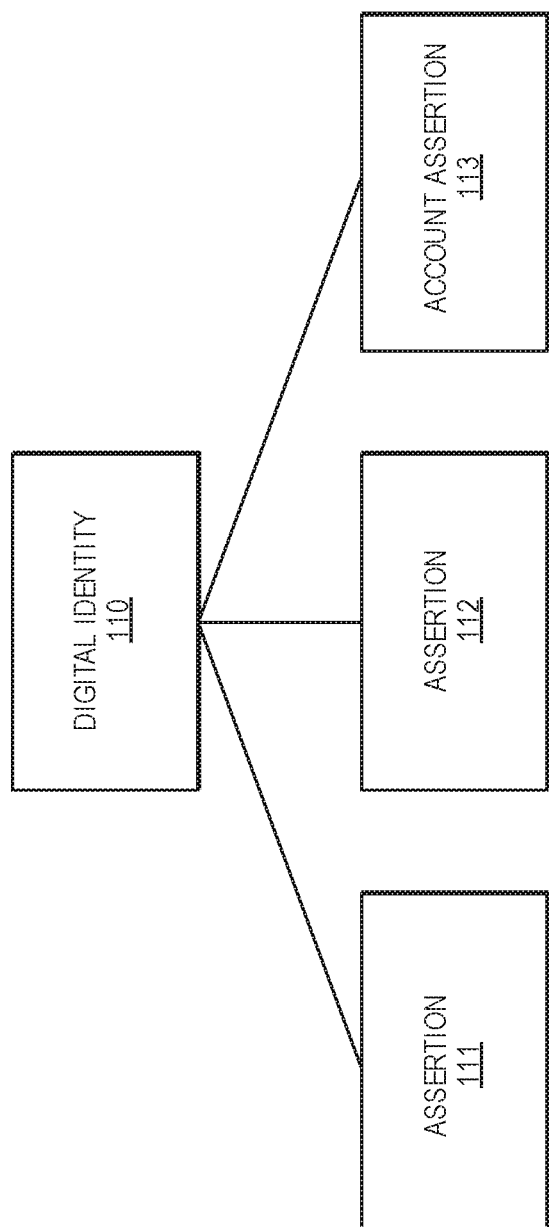
FIG. 3 shows a block diagram of the relationship between a digital identity and account assertions according to embodiments.

FIG. 3 shows the relationship between a DI and account assertions. Digital identity 110 may be a reference to DI 110, such as an identifier of DI 110, or an index to a location of DI 110 in a distributed ledger. The digital identity 110 may be related to a plurality of assertions 111, 112, and 113. The assertions 111, 112, 113 may be in an assertions database and include a reference to the digital identity 110. Some assertions of the plurality of assertions related to the digital identity 110 may be account assertions, such as account assertion 113. For example, account assertion 113 may be an assertion that a user has an account with a particular bank.

Figure 4:
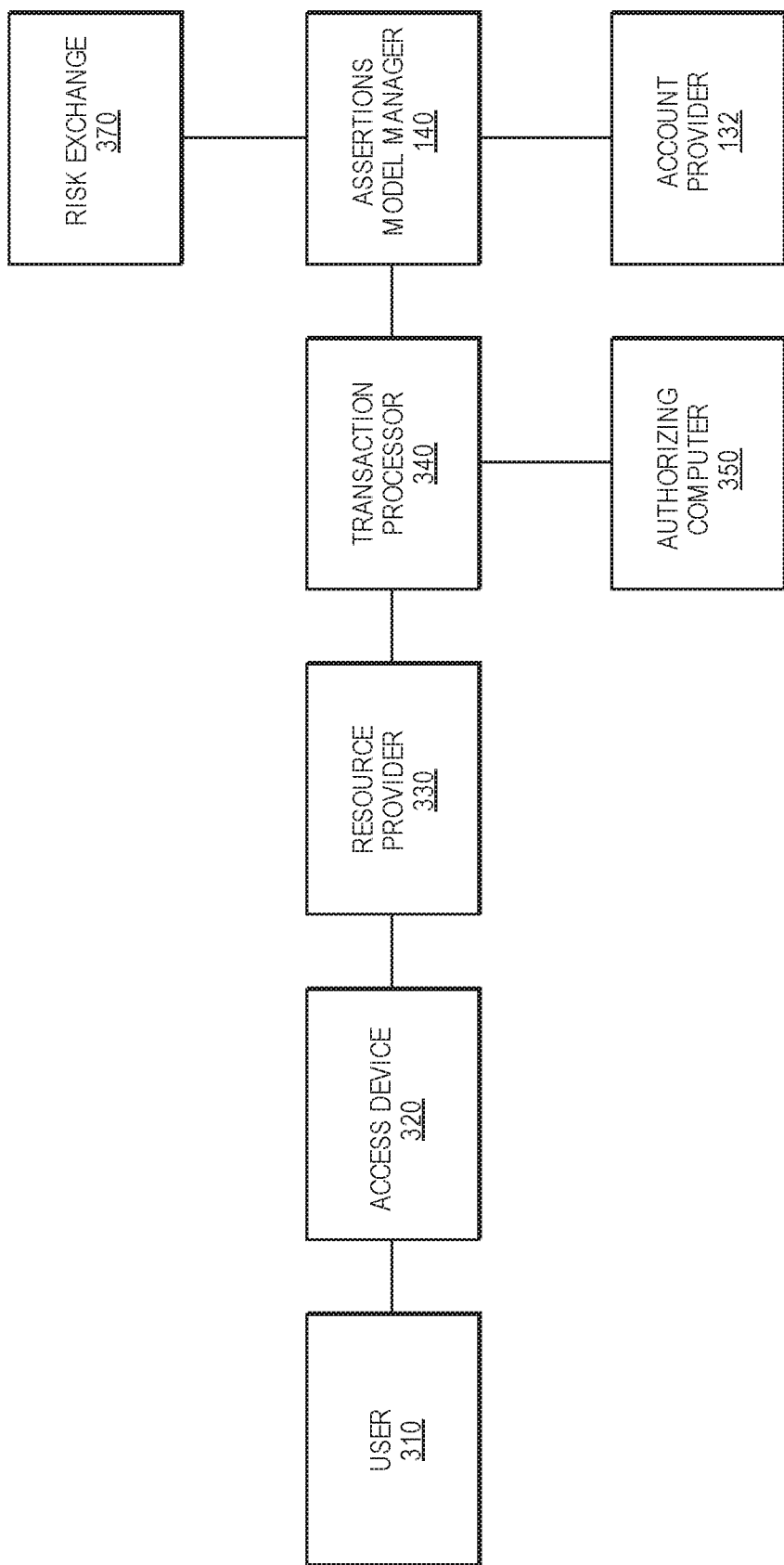
FIG. 4 shows a block diagram of a system for submitting an identity-based transaction to a risk exchange according to embodiments.

FIG. 4 shows a block diagram of a process of an assertions model manager with a risk exchange. FIG. 4 includes a user 310, an access device 320, a resource provider 330, a transaction processor 340, an authorizing computer 350, an assertions model manager 140, a risk exchange 370, and an account provider 132.

A user 310 may be an entity associated with a digital identity that is attempting to initiate some transaction. In some embodiments, the transaction may be a payment transaction. In another embodiment, for example, the transaction may be entering a secure area. In initiating an identity-based transaction, the user 310 may present their identifier or an identifier of the digital identity to the access device 320. The identifier of the user may include data associated with a digital signature and/or cryptographic key of the user 310. For example, the user 310 may use a mobile device to transmit their identifier to the access device 320. Alternatively, or additionally, the identifier of the user may include an ID number, a QR code, and/or the like. For example, the access device 320 may scan a QR code displayed on a mobile device of the user 310 to access the identifier. Examples of access devices 320 may include a POS terminal and a mobile computer.

The access device 320 may be operated by a resource provider 330. The resource provider may be, for example, a merchant. The resource provider 330 may be a relying entity, such as relying entity 170 in FIG. 1.

The resource provider 330 may be in communication with a transaction processor 340. The transaction processor 340 processes a transaction. The transaction processor 340 may be an acquirer of the resource provider 330. The transaction processor 340 may also be a payment processing network.

The transaction processor 340 may be in communication with an authorizing computer 350. The authorizing computer 350 may authorize transactions received from the resource provider 330. In some embodiments, the assertions model manager 140 may authorize transactions. To do so, the assertions model manager 140 may use stand-in processing.

The transaction processor 340 may be in communication with the assertions model manager 140 via an API exposed by the assertions model manager 140. The API may allow the transaction processor 340 to send messages that contain an identifier of the user 310, an identifier of the resource provider 330, and information about an identity-based transaction. The assertions model manager 140 may use the identifier of the user 310 or the identifier of the DI to retrieve the DI of the user, for example from a DI database or a DI provider as in FIG. 1 and FIG. 2.

The assertions model manager 140 may be in communication with a risk exchange 370. The risk exchange 370 may be a system that allows various entities to assume the risk for a transaction. The risk exchange 370 may receive transactions, or transaction pools, with a certain amount of risk and/or a price based on that risk. The risk exchange 370 may then allow entities to assume the risk for the transaction in exchange for some compensation. In some embodiments, settlement of transactions may be done by the risk exchange 370 or the transaction processor 340.

The assertions model manager 140 may also be in communication with an account provider 132. There may be just one account provider 132 involved in an identity-based transaction. In some embodiments, there may be more than one account provider involved in a transaction. For example, in a payment transaction, the payment may be split between multiple accounts of the user 310. Then the account provider 132 may represent the one or more account providers 132, 134, 136 as shown in FIG. 2.

Figure 5:
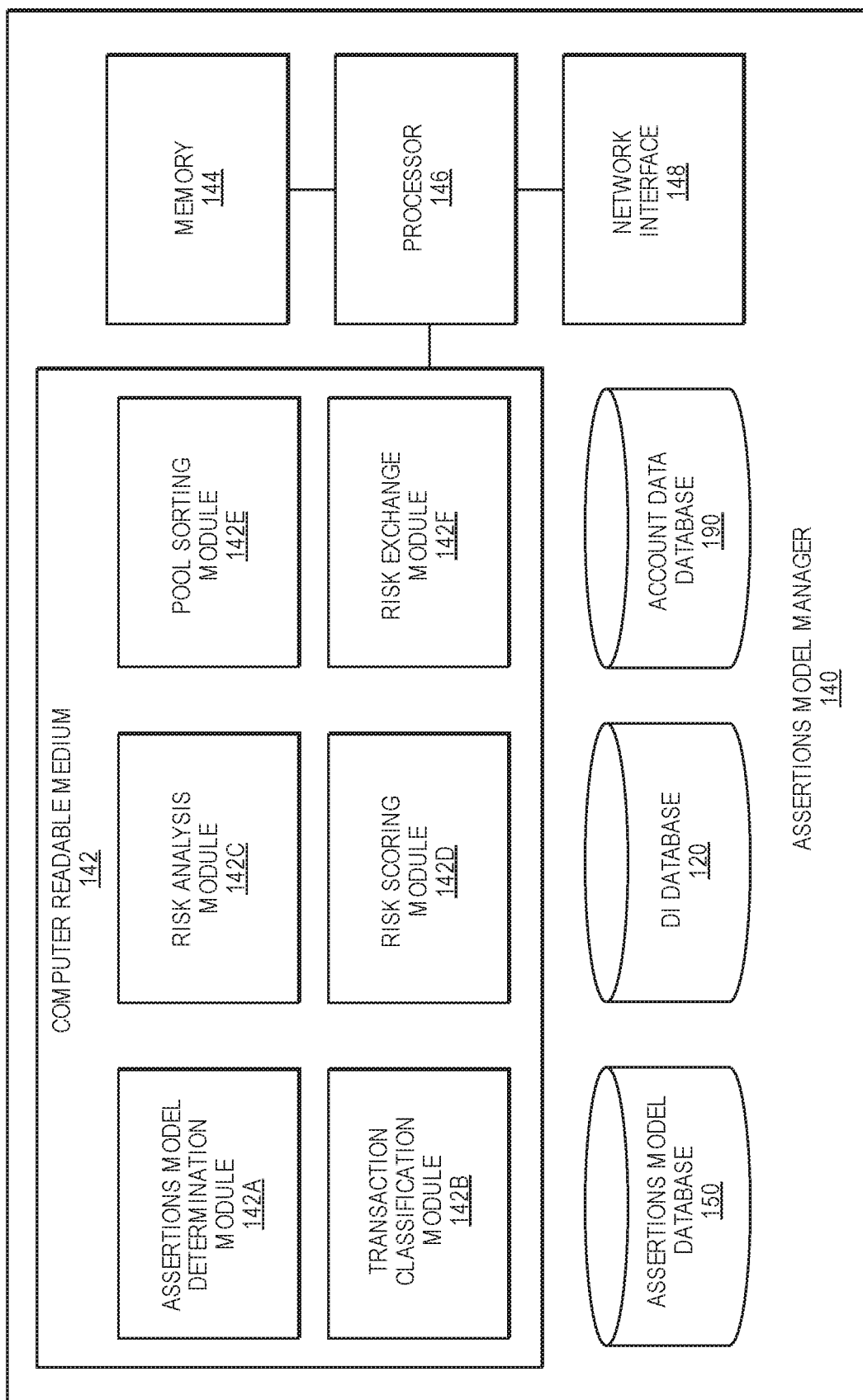
FIG. 5 shows a block diagram of an assertions model manager according to embodiments.

FIG. 5 shows a block diagram of an assertions model manager according to embodiments. The assertions model manager 140 may comprise a processor 146 operatively coupled to a memory 144, a network interface 148, and a computer-readable medium 142. The assertions model manager 240 may further include or be in communication with an assertions model database 150, a DI database 120, and an account data database 190.

The assertions model database 150 may have information about assertions models from different relying entities. Assertions models may be used to limit the amount of information about a user 310 that can be requested by a relying entity 170.

The DI database 120 may have information about digital identities. The DI database 120 may also be part of the DI provider. The DI database 120 may store DIs and identifiers of the DIs. In some embodiments the DI database 120 may also store assertions about the DIs. The assertions model manager 140 may be able to use an identifier of a user or an identifier of a DI to retrieve an associated DI from the DI database 120.

The account data database 190 may have information about accounts associated with the digital identities. The information about accounts may come from the plurality of account providers. In some embodiments, the account data database 190 may be part of an assertions database. Some assertions may have information about accounts associated with the digital identity. Therefore, the subset of assertions in an assertions database may comprise the account data database 190.

The network interface 148 may be configured to connect to one or more communication networks to allow the assertions model manager 140 to communicate with other entities such as the DI provider 130, the relying entity 170, the user 310, etc. For example, communication with the assertions model manager 140 can be direct, indirect, and/or via an API.

The processor 146 may be implemented as one or more integrated circuits (e.g., one or more single core or multicore microprocessors and/or microcontrollers). The processor 146 may be used to control the operation of the assertions model manager 140. The processor 146 can execute a variety of programs in response to program code or computer-readable code stored in memory 144. The processor 146 may include functionality to maintain multiple concurrently executing programs or processes.

The memory 144 may be implemented using any combination of any number of non-volatile memories (e.g., flash memory) and volatile memories (e.g., DRAM, SRAM), or any other non-transitory storage medium, or a combination of media.

The computer-readable medium 142 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 142 may be any combination of such storage or transmission devices.

The computer-readable medium 142 may comprise software code stored as a series of instructions or commands. The computer-readable medium 142 may comprise an assertions model determination module 142A, a transaction classification module 142B, a risk analysis module 142C, a risk scoring module 142D, a pool sorting module 142E, and a risk exchange module 142F.

The assertions model determination module 142A, in conjunction with the processor 146, may allow the assertions model manager 140 to determine the appropriate assertions model for the relying entity and to determine the assertions for the assertions model based on the user. Each relying entity may require a different set of assertions, depending on the pairwise relationship between the user and the relying entity.

The transaction classification module 142B in conjunction with the processor 146, may allow the assertions model manager 140 to classify received transactions based on information provided by the resource provider. The transaction classification module 142B, in conjunction with the processor 146, may also classify the transactions based on the assertions models. Transactions with similar assertions models are likely to be similar in the calculation of their risk.

The risk analysis module 142C, in conjunction with the processor 146, may allow the assertions model manager 140 to analyze the risk associated with a transaction, based on the assertions involved in the transaction. The risk may be the probability that the transaction is not completed successfully. One factor that may affect risk is the strength of the assertions used in the transaction. Weaker assertions may indicate, for example, a less-trustworthy user or a fraudulent transaction. As an example, the risk analysis module 142C, in conjunction with the processor 146, may determine the risk for an assertion based on the latest update to the underlying identity attribute data, the reference source of the underlying attribute data (e.g., a driver's license, or a statement from an individual), and/or the DI provider associated with the underlying attribute data. For example, a social media assertion may be generated based on only a validated email address. Accordingly, the social media assertion may be assigned a relatively "weak" score. A bank may generate an assertion using identity attribute data confirmed using a state document like a driver's license, proof of address, background checks of the data against several different databases (e.g. credit history), and a bank clerk looking at an individual to verify that the individual matches the presented driver's license picture. Accordingly, an assertion from a bank may produce a relatively "strong" score indicating confidence in the assertion. The risk analysis module 142C, in conjunction with the processor 146, may also use transaction details when assessing the transaction risk.

The risk scoring module 142D, in conjunction with the processor 146, may allow the assertions model manager 140 to score transactions based on the analysis provided by the risk analysis module 142C. The risk score may be derived from historical information about the rate of successful settlement for similar transactions. The risk score may also be derived as a function of the root identity attribute data, the verifications performed, and/or confidence in the DI provider. Assertions that are less trusted may result in a multiplicative factor for the risk score to increase the risk determined for the transaction. Additionally, historical information may be weighted to reflect the relevance on recent transactions being scored. For example, historical information from more than one year ago may have less weight than historical information from less than one month ago.

The pool sorting module 142E, in conjunction with the processor 146, may allow the assertions model manager 140 to sort transactions into transaction pools, or tranches, based on the risk score. For example, transactions with risk scores that are equal may be sorted together. In another example, transactions with risk scores that fall within a certain range may be sorted together.

The risk exchange module 142F, in conjunction with the processor 146, may allow the assertions model manager 140 to determine a price for the transaction and/or transaction pool, based on the risk score. The price may also reflect market forces. The risk exchange module 142F, in conjunction with the processor 146, may also determine a price for a pool of transactions. The risk exchange module 142F, in conjunction with the processor 146, may send the transaction and/or transaction pool to a risk exchange.

Figure 6:
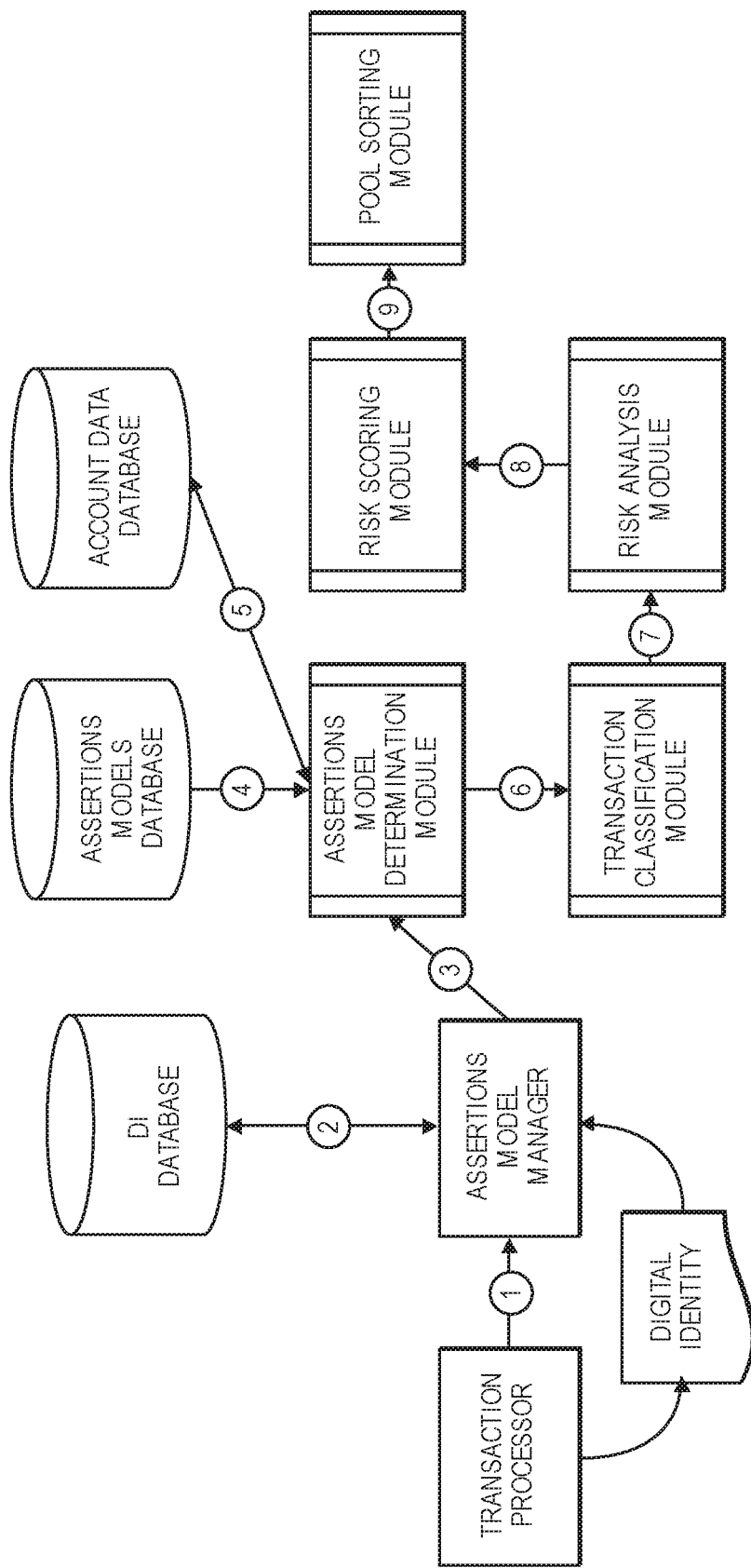
FIG. 6 shows a sequence diagram for a method of identity-based transaction risk analysis according to embodiments.

FIG. 6 shows a process of a transaction with an assertions model manager. At step 1, an assertions model manager may receive an authorization request message for an identity-based transaction from a transaction processor. The authorization request message may include transaction information (e.g., transaction value, time, location), a resource provider identifier (e.g., a public key of the resource provider), and an identifier of the user (e.g., a public key of the user). The identifier of the user may also correspond to an identifier of a digital identity associated with the user.

In step 2, the assertions model manager may send the identifier of the user to the DI database. The assertions model manager may additionally, or alternatively, send the identifier of the DI to the DI database. The DI database may then perform a search of the DI database for the corresponding DI. For example, the DI database may find the DI that corresponds to a public key of the user. The assertions model manager may then receive a DI associated with the identifier of the user from the DI database. In this way the DI database may function as a DI provider. In some embodiments, the assertions model manager may access the DI database through a DI provider.

In step 3, the assertions model manager may send the transaction information to an assertions model determination module.

In step 4, the assertions model determination module may query the assertions model database and may receive information from the assertions model database. The assertions model determination module may then determine an assertions model based on the resource provider identifier and the digital identity, in addition to any other relevant transaction information. The assertions model manager may determine a set of assertions, such as by querying an assertions database. The assertions model determination module may also use the relying entity identifier to determine a resource provider type. The resource provider type may also be used to determine an assertions model. For example, Joe's Liquor may have a resource provider identifier "JOESL", and the resource provider type may be "liquor store". An assertions model may be determined based on the resource provider type of "liquor store."

In some embodiments, an assertions model may be tailored to one or more types of recourse providers or domains (e.g., there may be an assertions model for ecommerce, an assertions model for government entities, an assertions model for bars, an assertions model for rental car companies, etc.). As an example, an assertions model for the type of resource provider "liquor store" may include two types of assertions: (1) whether the user is 21 or older and (2) whether the user has access to at least $5 in a payment account. Alternatively, or additionally, an assertions model may be tailored to a specific resource provider (e.g. a particular store, the DMV, a particular restaurant, etc.). As an example, an assertions model for Joe's Liquor may include two types of assertions: (1) whether the user is 21 or older and (2) whether the user has at least $50 in a payment account. Additionally or alternatively, assertions models may vary according to the user and/or DI provider.

As a more specific illustration, the user may be named "Bob Smith" which has a digital identity identifier such as "Bob_Smith_1234" and may have a digital identity that includes attributes including an age of 26 years hold, and a checking account with $1000 in it. The actual assertion model that is created may include two assertions: 1) Bob_Smith_1234 is over 21 years old and 2) Bob_Smith_1234 has over $50 in a payment account.

In step 5, the assertions model manager may retrieve account information from an account data database. The account information may be from a set of one or more accounts associated with the digital identity. Account information may also be from one or more account assertions from an assertions database. The assertions model manager may then use this information to determine a set of accounts (e.g., a credit card account, a debit card account, a social media account, a government account) associated with the user.

The assertions model manager may also retrieve historical transaction information associated with the set of accounts. Historical transaction information may include information such as transaction types, resource providers, and settlement rates associated with past transaction conducted by the digital identity. For example, historical transaction information may include information such as whether or not accounts associated with the digital identity are delinquent, how long the accounts have been open, and transactions conducted with the accounts in the past year.

In step 6, the assertions model determination module may send the transaction information to a transaction classification module. The transaction classification module may determine, from the identity-based transaction and the assertions model, a transaction type. The transaction classification module may use the assertions model to determine a transaction type. For example, a transaction associated with an assertions model including the assertions: (1) the user is 21 or older and (2) the user has access to at least $5 in a payment account may be determined to be a "Type A" transaction. The transaction classification module may use transaction information in addition to the assertions module to determine a transaction type. For example, a transaction associated with an assertions model including the assertions: (1) the user is 21 or older and (2) the user has access to at least $5 in a payment account, with a transaction value of less than $100 may be determined to be a "Type A" transaction. A transaction with the same assertions, but a transaction value of more than $100 may be determined to be a "Type B" transaction.

In step 7, the transaction classification module can send the transaction information and transaction type to a risk analysis module. The risk may be the probability that the transaction is not completed successfully. This can be dependent on the likelihood of fraud and/or non-payment. The risk analysis module can use the received information to analyze the risk involved with the transaction. For example, the transaction classification module may determine that Type B transactions have a higher risk than Type A transactions. The transaction classification module may also determine, for example, that transactions involving small, local resource providers have a higher risk than transactions involving large, well-known resource providers. The strength of assertions may also be used to determine risk for the transaction. The risk analysis may also use information about the digital identity when analyzing risk.

In step 8, the risk analysis module may send the transaction information and risk information to the risk scoring module. The risk scoring module may then calculate a risk score associated with the identity-based transaction. The risk score may be based on the fraction of transactions over a timer period, with the same relying entity, that have completed successfully. The risk scoring module may use the risk analysis information and/or transaction classification when calculating risk. For example, the risk analysis module may calculate that Type A transactions have a risk score of 3%. The risk score for an entity may also be calculated using risk calculation formulas such as those developed by the National Institute of Standards and Technology (NIST). The strength of the assertions involved in the transaction may also be used when calculating the risk score. For example, the strength score of the assertions in one transaction may be determined to be 90%, because the assertions are based on government documents such as a driver's license and a birth certificate. Another transaction of the same type may have assertions with a strength score of 45%, because the assertions are based on a social media profile. The first transaction may then have a risk score of 1.5%, that is half as much as the risk score of the second transaction, or 3%. The risk scoring module may also calculate a risk score based on the historical transaction information associated with the set of accounts of the user. For example, a user may have successfully completed several transactions using one of a plurality accounts that they have. Then, when the user initiates a transaction involving a different account, the risk score may be lower than if the first account had not been taken into consideration.

In step 9, the risk scoring module may send the transaction information to a pool sorting module. The pool sorting module can then sort the identity-based transaction into a transaction pool, or tranche, of similar transactions. The pool sorting module may sort the transactions based on the resource provider type and the transaction type. Transactions with similar resource provider types and transaction types are likely to have similar amounts of risk. Alternatively, or additionally, the pool sorting module may sort transactions based on the risk score of the transactions. For example, the pool sorting module may group together transactions that have the same risk score, or with risk scores that fall within predetermined ranges. The pools of similar transactions can then be offered in a risk exchange, shown in FIG. 7.

The assertions model manager may then perform processing of the identity-based transaction based on the risk score. Some of the processing may include authorizing stand-in processing of the transaction. In stand-in processing, the assertions model manager may authorize the transaction, instead of sending the transaction to an issuer. Authorization of the transaction may depend on the assertions provided and the risk score calculated by the risk scoring module. Processing may also include authenticating the transaction. By processing the digital identity of the user, the assertions model manger may verify that the digital identity is genuine. Processing may also include the processes of risk analysis and risk scoring.

Figure 7:
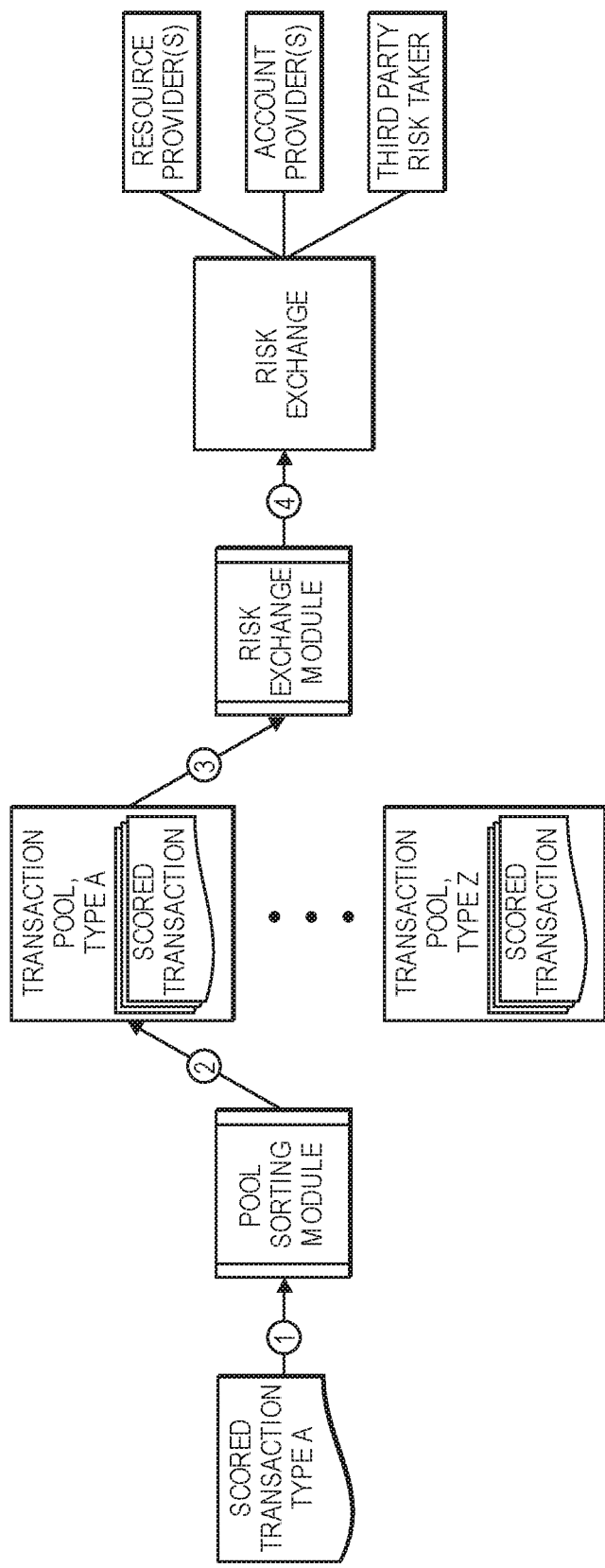
FIG. 7 shows a sequence diagram for a method of risk exchange according to embodiments.

FIG. 7 shows a process flow for a scored transaction being offered to a risk exchange. This may be done with a transaction that has already been classified and scored. For example, the transaction classification module may have determined that the transaction is Type A.

In step 1, the pool sorting module may receive the scored transaction. This transaction may have been scored by a process as in FIG. 6. The pool sorting module can then sort the transaction into a pool of related transactions. For example, there may be classes of transactions labeled Type A through Type Z. The pool sorting module may also sort the transactions based on risk score. For example, the pool sorting module may group together transactions that have the same risk score, or with risk scores that fall within predetermined ranges.

In step 2, the pool sorting module may place the transaction into a pool with other transactions with similar classifications. For example, the pool sorting module may sort the transaction with other Type A transactions.

In step 3, the transaction pool may be sent to a risk exchange module. The risk exchange module can calculate a value associated with the transaction pool of similar transactions. The value may be associated with the risk score. The value may also reflect market forces. The risk exchange module may then offer the transaction pool of similar transactions based on the calculated value.

In step 4, the risk exchange module can send the transaction pool to a risk exchange. In the risk exchange, entities may bid on or purchase risk from the risk exchange. For example, the resource provider may take on the risk of the transaction. Alternately, other resource providers not involved in the transaction may take on the risk. Account providers may also take on the risk. An account provider that takes on the risk may be an account provider involved in the transaction. The account provider may also be an account provider that is not involved in the transaction, or that is not associated with the user. The risk may also be purchased by a third party risk taker.

Figure 8:
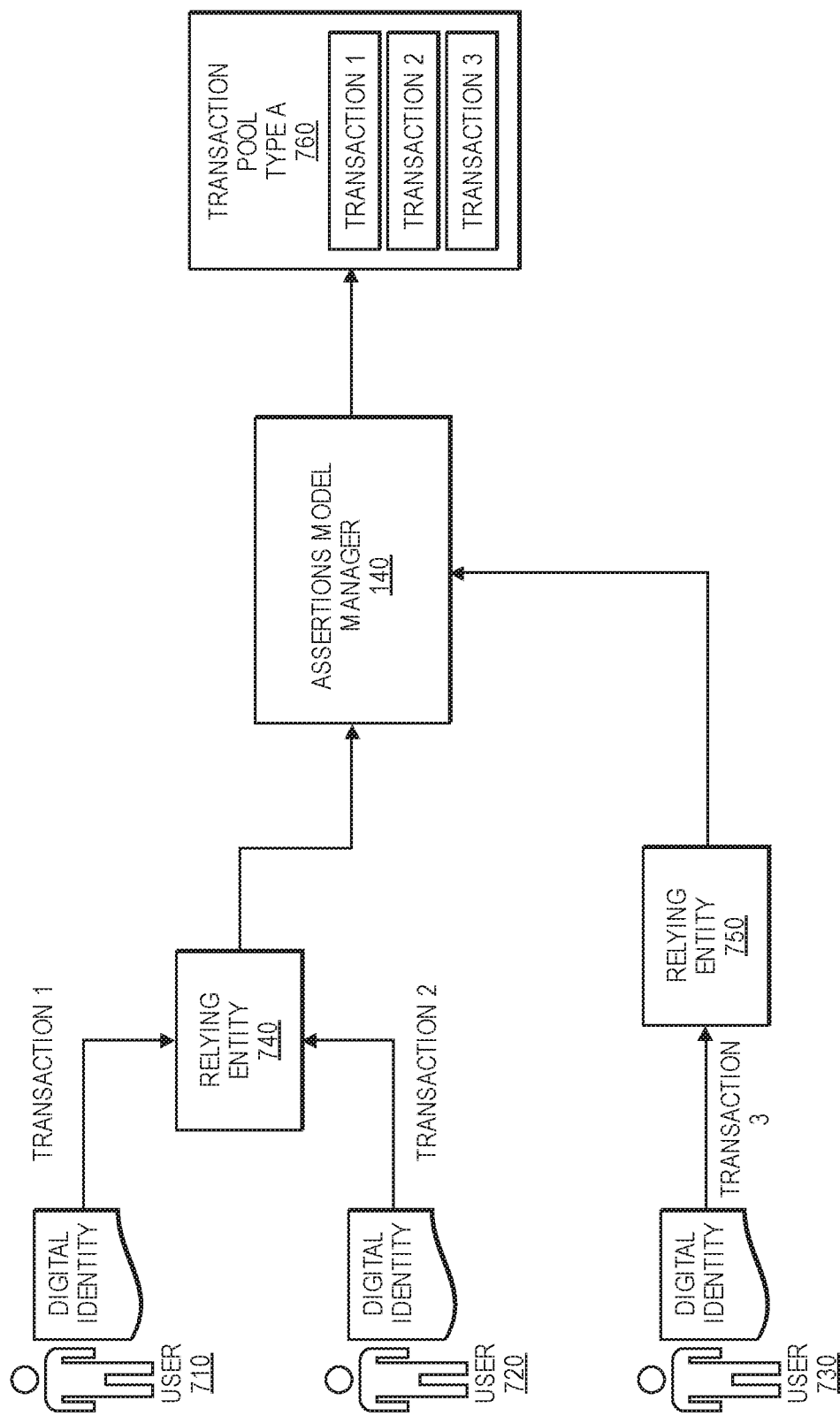
FIG. 8 shows a flow diagram for identity-based transaction pool sorting according to embodiments.

FIG. 8 shows how transactions from multiple users may be grouped into pools.

There may be a plurality of users 710, 720, 730 conducting identity-based transactions. Each user may be associated with a digital identity 715, 725, 735 respectively. User 710 may conduct identity-based transaction 1 with relying entity 740 (e.g., a resource provider), and user 720 may conduct identity-based transaction 2 with the relying entity 740. User 730 may use their digital identity 735 to conduct a transaction with relying entity 750 (e.g., another resource provider). All three transaction may then be sent to the assertions model manager 140.

The transactions with relying entity 740 may be both classified by the assertions model manager 140 as Type A, for example. The assertions model manager 140 may also classify the transaction with relying entity 750 as Type A. The transactions may have been classified together because relying entities 740 and 750 are of the same relying entity type. The transactions may also have been classified together because they involved the same or similar assertions models. Therefore, when the assertions model manager 140 creates transaction pools for a risk exchange, the transactions from users 710, 720, 730 may all be grouped into a transaction pool 760 because they were all classified as Type A.

Figure 9:
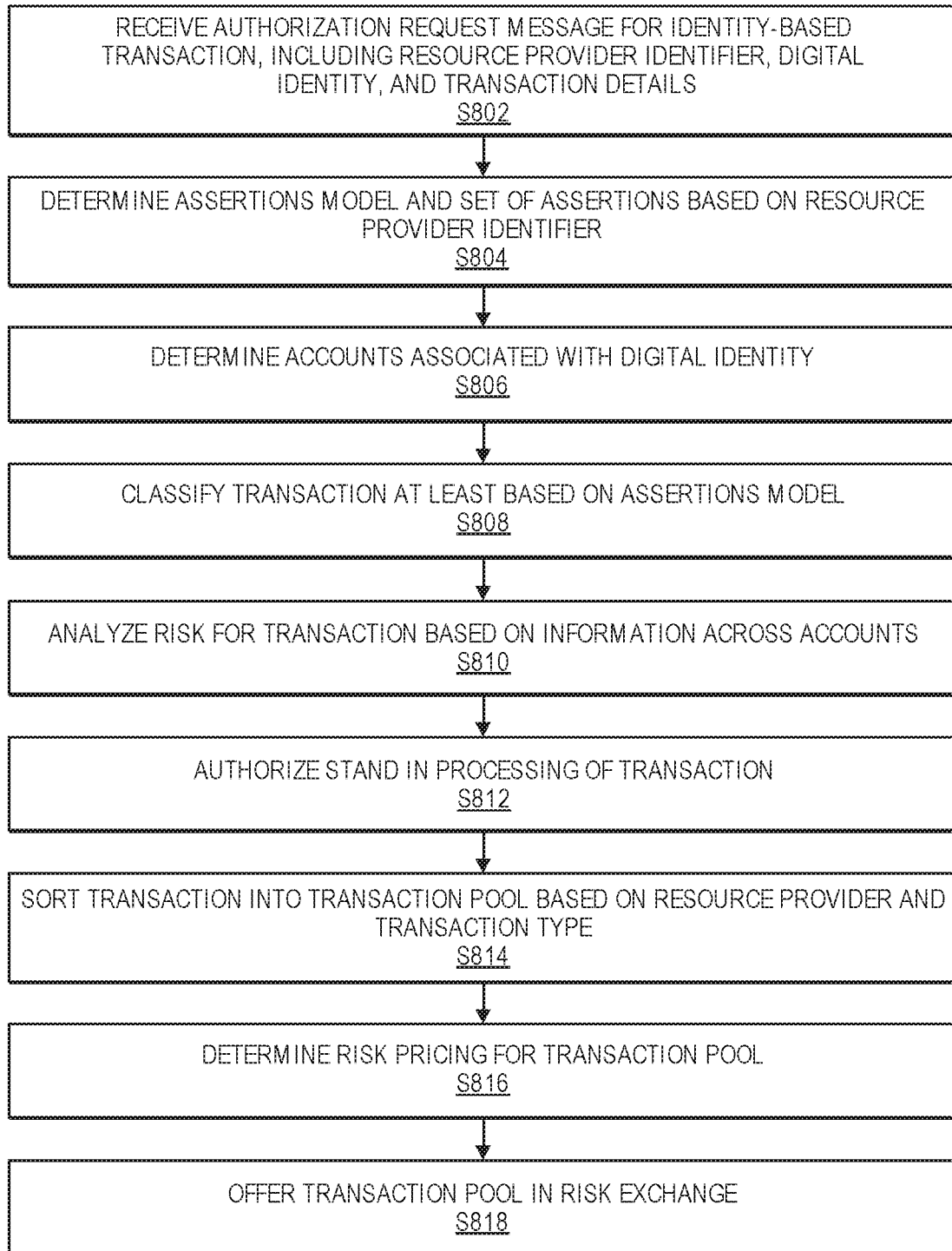
FIG. 9 shows a flow diagram for a method of analyzing and scoring an identity-based transaction according to embodiments.

FIG. 9 shows a flow diagram for classifying an identity-based transaction and analyzing the associated risk.

In step S802, an assertions model manager can receive an authorization request message for an identity based transaction. The request message may include a resource provider identifier, an identifier of a digital identity, and transaction details. In some embodiments, the authorization request message may include an identifier of a user associated with the digital identity instead of, or in addition to, the identifier of the digital identity. The assertions model manager may retrieve the digital identity from a DI database, for example. The transaction details may include the transaction value, the goods or services involved in the transaction, a time of the transaction, and a location of the transaction.

In step S804, the assertions model manager can determine an assertions model, including a set of assertions, based on the digital identity. The assertions model may also depend on the resource provider identifier. For example, if the resource provider is a car rental agency, the assertions model may comprise assertions that the user is of legal age to rent a car in their country, that the user has a valid driver's license, and that the user has at least one valid payment account. In some embodiments, the assertions model may depend of the type of resource provider.

The assertions model manager may determine and/or generate a set of assertions for the assertions model. The assertions may be based on identity attributes of the digital identity, as provided by references. For example, to generate an assertion that the user associated with the digital identity is of legal age to rent a car in their country, the assertions model manager may use a driver's license of the user to determine their age and a government entity to determine the legal age to rent a car. If the user's age is greater than the minimum required to rent a car, then the assertions model manager may generate an assertion that the user is of legal age to rent a car in their country. Some assertions may be account assertions and provide information about one or more accounts associated with the digital identity.

In step S806, the assertions model manager can determine one or more accounts associated with the digital identity. The assertions model may determine the one or more accounts with account assertions. In some embodiments, the assertions model manager may retrieve account information from an account data database. For example, to determine if the user has at least one valid payment account, the assertions model manager may request information from the accounts. If at least one account of the plurality of accounts indicates that the user has a valid payment account, then the assertions model manager may generate an assertion that the user has at least one valid payment account. The accounts may be associated with one or move account providers. The assertions model manager may also retrieve historical information associated with the one or more accounts. The historical information may include previous transactions completed with the accounts and a length of time that the accounts have been active.

In step S808, the assertions model manager can classify the transaction. In some embodiments, the classification may be based on at least the assertions model. Transactions that involve similar assertions models likely have similar characteristics. The assertions model manager may also use the set of assertions to classify the transaction. Transactions with a similar set of assertions are likely to be even more similar than transactions with similar assertions models. The assertions model manager may also use the resource provider identifier and/or the resource provider type when classifying the transaction.

In step S810, the assertions model manager can analyze the risk for the transaction. The risk of an identity-based transaction may be denoted as Risk(Txn$_I$) or R$_{T_I}$. The information used in determining the risk may be derived from information across the one or more accounts associated with the user, in addition to account or accounts involved in the transaction. For example, a user may be completing a transaction using one of three accounts that they have. When analyzing risk, the assertions model manager may use information from all three accounts. The assertions model manager may also use the historical account information retrieved in step S806.

The risk may be analyzed based on a set of transactions in a given period of time. The time period for aggregation of the transactions may be denoted T$_y$. The length of time used to aggregate transactions may be kept approximately constant. For example, if T$_y$ is 1 hour, then the risk may be compared to transactions within a 1 hour time period, and other 1 hour time periods of transaction data, but not transactions that were accumulated over 12 hours. There may be an assertions package $\{Assertion_R\}$ for the pairwise relationship of the holder H (i.e., the user with the digital identity) and the relying party R (i.e., the entity requesting the assertions).

There may also be a settlement risk score associated with the settlement rate per transaction, which may be defined as one minus the total number of successful transactions with a particular relying entity R (or with a particular resource provider) in time period T$_y$ divided by the total number of transactions with relying entity R in T$_y$ as in the equation below.

$$:= 1 - \left( \frac{\sum_1^{T_y} (\text{\# successful})_R}{\sum_1^{T_y} (\text{total } txn)_R} \right)$$

For example, the relying entity may be a merchant, and the merchant may have been involved in 1000 transactions in the time period of 1 day. 10 of the transactions may have failed in some way (e.g., the user did not pay, the transaction was fraudulent), resulting in 990 successful transactions. Then, the settlement risk score will be $$1 - \frac{990}{1000} = 0.01.$$

The settlement risk score can then be converted to basis points (bps) for use when calculating a value. For example, if the score is 0.01 or 1%, this can be converted to 100 bps.

The risk score for the transaction can be calculated based on a combination of one or more risk scores for entities involved in the transaction and the strength of the assertions. The risk score for a transaction is may be based on the combination of the risk score of the user, the risk score of the resource provider, the risk score of the assertion providers, and the relationship between the entities. The relationship between the entities may include a record of past transactions between the user and the resource provider. The relationship between the entities may comprise historical transaction data. There may also be a weighting function to combine this information. For example, less weight may be given to historical transaction data that is older than 6 months, and more weight may be given to historical transaction data that is less than a week old.

The strength of the assertions can also be used to determine the risk associated with a transaction. For example, the assertions model manager may assess entities that provide information for assertions. An assertion provided by an entity found to be reliable may lower the risk associated with the transaction. An assertion provided by an entity found to be unreliable may raise the risk.

The value of risk for an identity-based transaction with the relying entity R, Txn$_{I_R}$, can be determined with respect to the set of transactions with the relying entity R in the time period T$_y$. The set of transactions may be a historical set of transactions with the same classification as the particular transaction being scored. The set of transactions may be denoted as Txn$_{A_R}$, and the set of transactions, without the particular transaction being scored may be denoted as Txn$_{A-1_R}$. Then the value of risk for the transaction may be the risk score of the transaction divided by total risk score of all of the other transaction in the set of transactions.

$$\text{Value of } Risk_{\{Txn_R\}_{T_y}} := \frac{\text{Risk } \{Txn_{I_R}\}_{T_y}}{\text{Risk } \{Txn_{A-1_R}\}_{T_y}}$$

The risk score for all of the other transactions in the set of transactions may be the settlement rate of the historical transactions, therefore the risk score may be a fixed quantity for a given set. It also may be assumed that R$_{T_I}$<R$_{T_A}$, that is, the risk associated with a particular identity-based transaction is less than or equal to the risk of the set of transactions.

In step S812, the assertions model manager can authorize stand-in processing of the transaction. That is, the assertions model manager may authorize the transaction, instead of sending the transaction to an authorizing entity (e.g., an issuer of the user) to be authorized. Once the transaction has been authorized, it may be sent to a transaction processor to be completed.

In step S814, the assertions model manager can sort the transaction into a transaction pool of transactions with similar risk. The sorting may be based on risk determined for the transaction. The sorting may also be based on the resource provider identifier and the transaction classification.

The transactions may be divided into tranches, or transaction pools. For a set of identity-based transactions Txn$_A$ conducted in a time period T$_y$, there may be n tranches defined. The tranches may be defined for risk values from R$_1$ to R$_{n+1}$. For example, R$_1$ may be the lowest risk value of the transactions in the set of transactions $Txn_A$, or another low risk score. $R_{n+1}$ may be the greatest risk value of the transactions in $Txn_A$, or another high risk score. $R_2$ through $R_n$ may be arbitrary intermediate risk scores. The tranches may then be defined as $$Tranche_1\{R_1 \leq R_{T_1} < R_2\}$$
$$Tranche_2\{R_2 \leq R_{T_2} < R_3\}$$
$$\vdots$$
$$Tranche_n\{R_n \leq R_{T_n} < R_{n+1}\}$$

For example, the risk may be divided into six tranches by standard deviations. There may be a tranche for risk scores less than one standard deviation above the mean risk score, a tranche for risk scores between one and two standard deviations above the mean risk score, a tranche for risk scores more than two standard deviations above the mean risk score, and similarly for risk scores below the mean risk score. Then, transactions can be sorted into the appropriate tranche based on their risk score.

In step S816, the assertions model manager can determine risk pricing for the transaction pool. The risk pricing may be based on the risk scores of the transactions in the transaction pool. In some embodiments, the risk pricing payout may be determined from the settlement rate of the transactions.

In step S818, the assertions model manager can offer the transaction pool in a risk exchange. In the risk exchange, entities may receive some compensation based on the risk pricing in exchange for assuming the risk of the transactions in the transaction pool.

Traditionally, issuers assume the risk of payment transactions either not being properly settled or being fraudulent. In some cases, the issuer may unnecessarily insure transactions that they may be should not have. The issuers do not have a choice given the limited amount of data that they have at their disposal.

Embodiments of the invention address this. By using a digital identity, the plurality of accounts associated with a user can be compared together, providing more data for a more accurate risk assessment. The transaction risk analysis is also made more accurate by including assertions. Embodiments of the invention also improve risk assessment by analyzing the validity of the information used in the risk analysis. The assertions platform can differentiate between risk analysis done with information from reliable and unreliable references.

Embodiments of the invention also save time and computing resources. Each issuer does not need to install their own risk analysis system. Instead, the assertions platform can provide a centralized processing center for transaction risk.

Providing the risk in a risk exchange also makes the transaction experience smoother for the user. There may be some transactions that previously would have been considered too high-risk, leading to the transaction being rejected even when they would have been successful. By providing a risk exchange, more high-risk transactions can be authorized because there are more potential entities who are less risk-averse and can take on the risk.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Such programs may also be encoded and transmitted using carrier signals adapted for transmission via wired, optical, and/or wireless networks conforming to a variety of protocols, including the Internet. As such, a computer-readable medium according to an embodiment may be created using a data signal encoded with such programs. Computer readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, at an assertions computer comprising a processor and an assertions model database coupled to the processor, the assertions model database comprising a plurality of different assertion models for a user with respect to different resource providers via a communications network, an authorization request message for an identity-based transaction, the authorization request message comprising a resource provider identifier identifying a resource provider, and an identifier of a digital identity of the user;

determining an assertions model in the plurality of different assertion models based on the resource provider identifier and the digital identity, the assertions model comprising a set of assertions that are secure facts about the user and that are specific to the resource provider;

determining a set of accounts associated with the user based on the digital identity of the user, and one or more assertions of the set of assertions;

calculating a risk score associated with the identity-based transaction using the assertions in the set of assertions; and performing processing of the identity-based transaction based on the risk score and using an account in the set of accounts,
wherein determining the set of accounts associated with the user based on the digital identity comprises:
retrieving account assertions associated with the digital identity, and
wherein calculating the risk score comprises:
determining a strength score for the set of assertions; and
calculating the risk score with the strength score and information about the identity-based transaction.

2. The method of claim 1, wherein processing comprises:
determining, from the resource provider identifier, a resource provider type;
determining, from the identity-based transaction and the set of assertions, a transaction type; and
adding the identity-based transaction into a transaction pool of similar transactions based on the resource provider type and the transaction type.

3. The method of claim 2, wherein processing further comprises:
calculating a value associated with the transaction pool of similar transactions.

4. The method of claim 3, wherein processing further comprises: offering the transaction pool of similar transactions based on the calculated value.

5. The method of claim 1, wherein processing comprises: authenticating the identity-based transaction.

6. The method of claim 1, further comprising:
retrieving historical transaction information associated with the set of accounts from a database.

7. The method of claim 1, further comprising:
retrieving historical transaction information associated with the set of accounts from a database; and
calculating the risk score associated with the identity-based transaction based on the historical transaction information associated with the set of accounts.

8. The method of claim 1, wherein the resource provider is a liquor store and the resource provider identifier identifies the liquor store, and wherein the set of assertions comprises an assertion that the user is over 21 years old, and wherein the user is 26 years old.

9. The method of claim 8, wherein the set of assertions comprises an assertion that the user has over a predetermined amount of money in the account of the set of accounts, and wherein the user has an amount more than the predetermined amount of money in the account.

10. An assertions computer comprising:
a processor;
an assertions model database comprising a plurality of different assertion models for a user with respect to different resource providers; and
a computer readable medium comprising code, executable by the processor, for implementing a method comprising:
receiving an authorization request message for an identity-based transaction, the authorization request message comprising a resource provider identifier identifying a resource provider, and an identifier of a digital identity of the user via a communications network;
determining an assertions model in the plurality of different assertion models based on the resource provider identifier and the digital identity of the user, the assertions model comprising a set of assertions that are secure facts about the user and that are specific to the resource provider;
determining a set of accounts associated with the user based on the digital identity of the user, and one or more assertions of the set of assertions;
calculating a risk score associated with the identity-based transaction using the assertions in the set of assertions; and
performing processing of the identity-based transaction based on the risk score and using an account in the set of accounts,
wherein determining the set of accounts associated with the user based on the digital identity comprises:
retrieving account assertions associated with the digital identity, and
wherein calculating the risk score comprises:
determining a strength score for the set of assertions; and
calculating the risk score with the strength score and information about the identity-based transaction.

11. The assertions computer of claim 10, wherein processing comprises:
determining, from the resource provider identifier, a resource provider type;
determining, from the identity-based transaction and the set of assertions, a transaction type; and
adding the identity-based transaction into a transaction pool of similar transactions based on the resource provider type and the transaction type.

12. The assertions computer of claim 11, wherein processing further comprises:
calculating a value associated with the transaction pool of similar transactions.

13. The assertions computer of claim 12, wherein processing further comprises:
offering the transaction pool of similar transactions based on the calculated value.

14. The assertions computer of claim 10, wherein processing comprises:
authenticating the identity-based transaction.

15. The assertions computer of claim 10, the method further comprising:
retrieving historical transaction information associated with the set of accounts from a database.

16. The assertions computer of claim 10, the method further comprising:
retrieving historical transaction information associated with the set of accounts from a database; and
calculating the risk score associated with the identity-based transaction based on the historical transaction information associated with the set of accounts.

* * * * *